United States Patent
Shibayama (10) Patent No.: US 7,369,324 B2
(45) Date of Patent: May 6, 2008

(54) ZOOM LENS SYSTEM

(75) Inventor: Atsushi Shibayama, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/390,291

(22) Filed: Mar. 28, 2006

(65) Prior Publication Data

US 2006/0221461 A1    Oct. 5, 2006

(30) Foreign Application Priority Data

Mar. 29, 2005    (JP)    ............................ 2005-095449

(51) Int. Cl.
    *G02B 15/14*    (2006.01)
(52) U.S. Cl. ...................... 359/686; 359/680
(58) Field of Classification Search ................ 359/680, 359/686
    See application file for complete search history.

(56) References Cited

U.S. PATENT DOCUMENTS

| | | | |
|---|---|---|---|
| 5,805,350 A | 9/1998 | Yamamoto | |
| 5,805,351 A * | 9/1998 | Hayashi | ....................... 359/686 |
| 2004/0179245 A1 | 9/2004 | Mihara | |

FOREIGN PATENT DOCUMENTS

| | | |
|---|---|---|
| JP | 9-243917 | 9/1997 |
| JP | 10-111455 | 4/1998 |
| JP | 2004-1835585 | 7/2001 |
| JP | 2004-246141 | 9/2004 |
| JP | 2004-271937 | 9/2004 |

\* cited by examiner

*Primary Examiner*—Scott J. Sugarman
*Assistant Examiner*—Darryl J. Collins
(74) *Attorney, Agent, or Firm*—Miles & Stockbridge P.C.

(57) ABSTRACT

Providing a compact zoom lens system with high optical performance suitable for an SLR digital camera with a solid-state imaging device of the APS-C size. The zoom lens system includes, in order from an object, a first group having negative power, a second group having positive power, a third group having negative power, and a fourth group having positive power. Upon zooming from a wide-angle end state to a telephoto end state, the second, third and fourth groups are moved to the object such that a distance between the first and second groups decreases, a distance between the second and third groups increases, and a distance between the third and fourth groups decreases. Each of the first, second and fourth groups is composed of at least one positive lens and at least one negative lens. The third group consists of a single lens. Given conditional expressions are satisfied.

40 Claims, 4 Drawing Sheets

ZOOM LENS SYSTEM

The disclosure of the following priority application is herein incorporated by reference:

Japanese Patent Application No. 2005-095449 filed on Mar. 29, 2005.

BACKGROUND OF THE INVENTION

1. Field of the Invention

The present invention relates to a zoom lens system suitable for a single-lens reflex camera.

2. Related Background Art

A zoom lens system has been proposed that is composed of, in order from an object, a first lens group having negative refractive power, a second lens group having positive refractive power, a third lens group having negative refractive power, and a fourth lens group having positive refractive power, wherein the third lens group is composed of a single lens (see, for example, Japanese Patent Application Laid-Open Nos. 2001-183585 and 2004-271937).

However, a zoom lens system disclosed in Japanese Patent Application Laid-Open No. 2001-183585 is a four-lens-group zoom lens having negative-positive-negative-positive power distribution, having a third lens group composed of a single lens element, and having an image circle suitable for a single-lens reflex 35 mm-camera using a 135 film format. Accordingly, when the zoom lens system is made a proportional reduction to obtain a zoom lens system for a single-lens reflex digital camera with a solid-state imaging device of an APS-C size (23.7 mm by 15.6 mm), it causes a problem that the back focal length becomes insufficient.

Moreover, a zoom lens system disclosed in Japanese Patent Application Laid-Open No. 2004-271937 is a five-lens-group zoom lens having negative-positive-negative-positive-positive power distribution, having a third lens group composed of a single lens element, and having an image circle suitable for a digital camera using a so-called ⅟₁.₈" type CCD imaging device. Accordingly, when the zoom lens system is made a proportional expansion to obtain an image circle for a single-lens reflex digital camera with a solid-state imaging device of an APS-C size, it causes a problem that the zoom lens system becomes too large.

Furthermore, since the zoom lens system disclosed in Japanese Patent Application Laid-Open No. 2004-271937 is not for a single-lens reflex camera, even if the zoom lens system is proportionally expanded, a sufficient back focal length for a single-lens reflex digital camera with a solid-state imaging device of an APS-C size cannot be obtained.

SUMMARY OF THE INVENTION

The present invention is made in view of the aforementioned problems, and has an object to provide a compact zoom lens system with high optical performance, suitable for a single-lens reflex digital camera with a solid-state imaging device of the so-called APS-C size.

According to a first aspect of the present invention, there is provided a zoom lens system including, in order from an object, a first lens group having negative refractive power, a second lens group having positive refractive power, a third lens group having negative refractive power, and a fourth lens group having positive refractive power. When a state of lens group positions varies from a wide-angle end state to a telephoto end state, the second lens group, the third lens group and the fourth lens group are moved to the object such that a distance between the first lens group and the second lens group decreases, a distance between the second lens group and the third lens group increases, and a distance between the third lens group and the fourth lens group decreases. The first lens group is composed of at least one positive lens and at least one negative lens. The second lens group is composed of at least one positive lens and at least one negative lens. The third lens group is composed of a single lens. The fourth lens group is composed of at least one positive lens and at least one negative lens. The following conditional expression (1) is satisfied:

$$-3.00 < f3/f4 < -0.60 \quad (1)$$

where f3 denotes a focal length of the third lens group, and f4 denotes a focal length of the fourth lens group.

In the first aspect of the present invention, the following conditional expression (2) is preferably satisfied:

$$1.70 < Bfw/fw \quad (2)$$

where Bfw denotes a back focal length of the zoom lens system in the wide-angle end state, and fw denotes a focal length of the zoom lens system in the wide-angle end state.

In the first aspect of the present invention, the following conditional expression (3) is preferably satisfied:

$$-2.00 < f1/fw < -1.00 \quad (3)$$

where f1 denotes a focal length of the first lens group, and fw denotes a focal length of the zoom lens system in the wide-angle end state.

In the first aspect of the present invention, the following conditional expression (4) is preferably satisfied:

$$1.00 < mv4/fw < 3.00 \quad (4)$$

where mv4 denotes a moving amount of the fourth lens group upon zooming from the wide-angle end state to the telephoto end state, and fw denotes a focal length of the zoom lens system in the wide-angle end state.

In the first aspect of the present invention, the following conditional expression (5) is preferably satisfied:

$$0.40 < (dif34-dif23)/dis24w < 1.30 \quad (5)$$

where dif23 denotes a value subtracted a distance between the second lens group and the third lens group in the telephoto end state from a distance between the second lens group and the third lens group in the wide-angle end state, dif34 denotes a value subtracted a distance between the third lens group and the fourth lens group in the telephoto end state from a distance between the third lens group and the fourth lens group in the wide-angle end state, and dis24w denotes a distance along the optical axis between the most image side lens surface in the second lens group and the most object side lens surface in the fourth lens group in the wide-angle end state.

In the first aspect of the present invention, an aperture stop is preferably disposed in the vicinity of the third lens group.

In the first aspect of the present invention, the first lens group preferably includes at least one aspherical surface.

According to a second aspect of the present invention, there is provided a zoom lens system including, in order from an object, a first lens group having negative refractive power, a second lens group having positive refractive power, a third lens group having negative refractive power, and a fourth lens group having positive refractive power. When a state of lens group positions varies from a wide-angle end state to a telephoto end state, the second lens group, the third lens group and the fourth lens group are moved to the object such that a distance between the first lens group and the second lens group decreases, a distance between the second lens group and the third lens group increases, and a distance between the third lens group and the fourth lens group decreases. The first lens group is composed of at least one positive lens and at least one negative lens. The second lens group is composed of at least one positive lens and at least one negative lens. The third lens group is composed of a single lens. The fourth lens group is composed of at least one positive lens and at least one negative lens. The following conditional expression (2) is satisfied:

$$1.70 < Bfw/fw \qquad (2)$$

where Bfw denotes a back focal length of the zoom lens system in the wide-angle end state, and fw denotes a focal length of the zoom lens system in the wide-angle end state.

According to a third aspect of the present invention, there is provided a method for forming an image of an object and varying a focal length of a zoom lens system that includes, in order from the object, a first lens group having negative refractive power, a second lens group having positive refractive power, a third lens group having negative refractive power, and a fourth lens group having positive refractive power, including steps of, providing the zoom lens system in which the first lens group is composed of at least one positive lens and at least one negative lens, the second lens group is composed of at least one positive lens and at least one negative lens, the third lens group is composed of a single lens, and the fourth lens group is composed of at least one positive lens and at least one negative lens, varying the focal length of the zoom lens system from a wide-angle end state to a telephoto end state by moving the second lens group, the third lens group and the fourth lens group to the object such that a distance between the first lens group and the second lens group decreases, a distance between the second lens group and the third lens group increases, and a distance between the third lens group and the fourth lens group decreases, and satisfying the following conditional expression (1):

$$-3.00 < f3/f4 < -0.60 \qquad (1)$$

where f3 denotes a focal length of the third lens group, and f4 denotes a focal length of the fourth lens group.

According to a fourth aspect of the present invention, there is provided a method for forming an image of an object and varying a focal length of a zoom lens system that includes, in order from the object, a first lens group having negative refractive power, a second lens group having positive refractive power, a third lens group having negative refractive power, and a fourth lens group having positive refractive power, including steps of, providing the zoom lens system in which the first lens group is composed of at least one positive lens and at least one negative lens, the second lens group is composed of at least one positive lens and at least one negative lens, the third lens group is composed of a single lens, and the fourth lens group is composed of at least one positive lens and at least one negative lens, varying the focal length of the zoom lens system from a wide-angle end state to a telephoto end state by moving the second lens group, the third lens group and the fourth lens group to the object such that a distance between the first lens group and the second lens group decreases, a distance between the second lens group and the third lens group increases, and a distance between the third lens group and the fourth lens group decreases, and satisfying the following conditional expression (2):

$$1.70 < Bfw/fw \qquad (2)$$

where Bfw denotes a back focal length of the zoom lens system in the wide-angle end state, and fw denotes a focal length of the zoom lens system in the wide-angle end state.

Other features and advantages according to the present invention will be readily under stood from the detailed description of the preferred embodiments in conjunction with the accompanying drawings.

DESCRIPTION OF THE MOST PREFERRED EMBODIMENTS

A zoom lens system according to the present invention is composed of, in order from an object, a first lens group having negative refractive power, a second lens group having positive refractive power, a third lens group having negative refractive power, and a fourth lens group having positive refractive power. When a state of lens group positions varies from a wide-angle end state to a telephoto end state, the second, third and fourth lens groups are moved to the object such that a distance between the first lens group and the second lens group decreases, a distance between the second lens group and the third lens group increases, and a distance between the third lens group and the fourth lens group decreases. The first lens group is composed of at least one positive lens and at least one negative lens. The second lens group is composed of at least one positive lens and at least one negative lens. The third lens group is composed of a single lens. The fourth lens group is composed of at least one positive lens and at least one negative lens. The following conditional expression (1) is satisfied:

$$-3.00 < f3/f4 < -0.60 \qquad (1)$$

where f3 denotes a focal length of the third lens group, and f4 denotes a focal length of the fourth lens group.

With the configuration having four lens groups which are, in order from the object, negative, positive, negative and positive lens groups, the zoom lens system according to the present invention makes it possible to secure both of a high zoom ratio and high optical performance. Moreover, with constructing the third lens group by a single lens, a cost reduction can be achieved.

On the other hand, in order to preferably reduce various aberrations, each of the first, second and fourth lens groups is necessary to be constructed by at least one positive lens and at least one negative lens.

In the zoom lens system according to the present invention, conditional expression (1) is for obtaining a sufficient back focal length suitable for a single-lens reflex digital camera having an APS-C image size with securing a zoom ratio of about three.

When the ratio f3/f4 is equal to or falls below the lower limit of conditional expression (1), refractive power of the third lens group becomes weak, so that it becomes difficult to secure an intended zoom ratio. On the other hand, when the ratio f3/f4 is equal to or exceeds the upper limit of conditional expression (1), the back focal length becomes short, so that it becomes unsuited to a single-lens reflex digital camera having an APS-C image size.

In order to secure the effect of the present invention, it is preferable to set the lower limit of conditional expression (1) to −2.00. In order to secure the effect of the present invention, it is preferable to set the upper limit of conditional expression (1) to −1.00.

Alternatively, a zoom lens system according to the present invention is composed of, in order from an object, a first lens group having negative refractive power, a second lens group having positive refractive power, a third lens group having negative refractive power, and a fourth lens group having positive refractive power. When a state of lens group positions varies from a wide-angle end state to a telephoto end state, the second, third and fourth lens groups are moved to the object such that a distance between the first lens group and the second lens group decreases, a distance between the second lens group and the third lens group increases, and a distance between the third lens group and the fourth lens group decreases. The first lens group is composed of at least one positive lens and at least one negative lens. The second lens group is composed of at least one positive lens and at least one negative lens. The third lens group is composed of a single lens. The fourth lens group is composed of at least one positive lens and at least one negative lens. The following conditional expression (2) is satisfied:

$$1.70 < Bfw/fw \qquad (2)$$

where Bfw denotes a back focal length of the zoom lens system in the wide-angle end state, and fw denotes a focal length of the zoom lens system in the wide-angle end state.

With the configuration having four lens groups which are, in order from the object, negative, positive, negative and positive lens groups, the zoom lens system according to the present invention makes it possible to secure both of a high zoom ratio and high optical performance. Moreover, with constructing the third lens group by a single lens, a cost reduction can be achieved.

On the other hand, in order to preferably reduce various aberrations, each of the first, second and fourth lens groups is necessary to be constructed by at least one positive lens and at least one negative lens.

In the zoom lens system according to the present invention, conditional expression (2) defines an appropriate range of a preferable back focal length suitable for a single-lens reflex digital camera having an APS-C image size. Here, the back focal length means a so-called equivalent air thickness of the back focal length which is a distance between the zoom lens system and the image plane removing various filters disposed in the distance with replacing them by air.

When the ratio Bfw/fw is equal to or falls below the lower limit of conditional expression (2), it becomes impossible to secure the back focal length suitable for a single-lens reflex digital camera having an APS-C image size.

In order to secure the effect of the present invention and to obtain an angle of view of about 80 degrees in the wide-angle end state, it is preferable to set the lower limit of conditional expression (2) to 1.90. In order to prevent the total lens length of the zoom lens system from getting large, it is preferable to set the upper limit of conditional expression (2) to 2.60.

In the zoom lens system according to the present invention, the following conditional expression (3) is preferably satisfied:

$$-2.00 < f1/fw < -1.00 \qquad (3)$$

where f1 denotes a focal length of the first lens group, and fw denotes a focal length of the zoom lens system in the wide-angle end state.

Conditional expression (3) is for accomplishing both of miniaturizing the zoom lens system and securing high optical performance. When the ratio f1/fw is equal to or falls below the lower limit of conditional expression (3), the total lens length of the zoom lens system as well as the effective diameter become large. On the other hand, when the ratio f1/fw is equal to or exceeds the upper limit of conditional expression (3), various aberrations including spherical aberration become large, so that it becomes difficult to make optical performance further higher.

In order to secure the effect of the present invention, it is preferable to set the lower limit of conditional expression (3) to −1.80. In order to secure the effect of the present invention, it is preferable to set the upper limit of conditional expression (3) to −1.30.

In the zoom lens system according to the present invention, the following conditional expression (4) is preferably satisfied:

$$1.00 < mv4/fw < 3.00 \qquad (4)$$

where mv4 denotes a moving amount of the fourth lens group upon zooming from the wide-angle end state to the telephoto end state, and fw denotes a focal length of the zoom lens system in the wide-angle end state.

In the zoom lens system according to the present invention, conditional expression (4) is for accomplishing both of miniaturizing the total lens length and securing a zoom ratio of about three. When the ratio mv4/fw is equal to or falls below the lower limit of conditional expression (4), it becomes difficult to secure the zoom ratio of about three. On the other hand, when the ratio mv4/fw is equal to or exceeds the upper limit of conditional expression (4), the moving amount of the fourth lens group becomes large, so that it becomes difficult to make the total lens length of the zoom lens system compact.

In order to secure the effect of the present invention, it is preferable to set the lower limit of conditional expression (4) to 1.50. In order to secure the effect of the present invention, it is preferable to set the upper limit of conditional expression (4) to 2.50.

In the zoom lens system according to the present invention, the following conditional expression (5) is preferably satisfied:

$$0.40 < (dif34 - dif23)/dis24w < 1.30 \qquad (5)$$

where dif23 denotes a value subtracted a distance between the second lens group and the third lens group in the telephoto end state from a distance between the second lens group and the third lens group in the wide-angle end state, dif34 denotes a value subtracted a distance between the third lens group and the fourth lens group in the telephoto end state from a distance between the third lens group and the fourth lens group in the wide-angle end state, dis24w denotes a distance along the optical axis between the most image side lens surface in the second lens group and the most object side lens surface in the fourth lens group in the wide-angle end state.

Conditional expression (5) is for increasing optical performance in the zoom lens system according to the present invention.

When the ratio (dif34−dif23)/dis24w is equal to or falls below the lower limit of conditional expression (5), variations in the spaces front and rear of the third lens group become small, so that it becomes difficult to correct variation in curvature of field upon zooming. On the other hand, when the ratio (dif34−dif23)/dis24w is equal to or exceeds the upper limit of conditional expression (5), variations in the spaces front and rear of the third lens group become large, so that there occurs a risk to collide the second lens group and the third lens group or the third lens group and the fourth lens group with each other.

In order to secure the effect of the present invention, it is preferable to set the lower limit of conditional expression (5) to 0.60. In order to secure the effect of the present invention, it is preferable to set the upper limit of conditional expression (5) to 1.10.

A zoom lens system according to each example of the present invention is explained below with reference to accompanying drawings.

EXAMPLE 1

Figure 1:
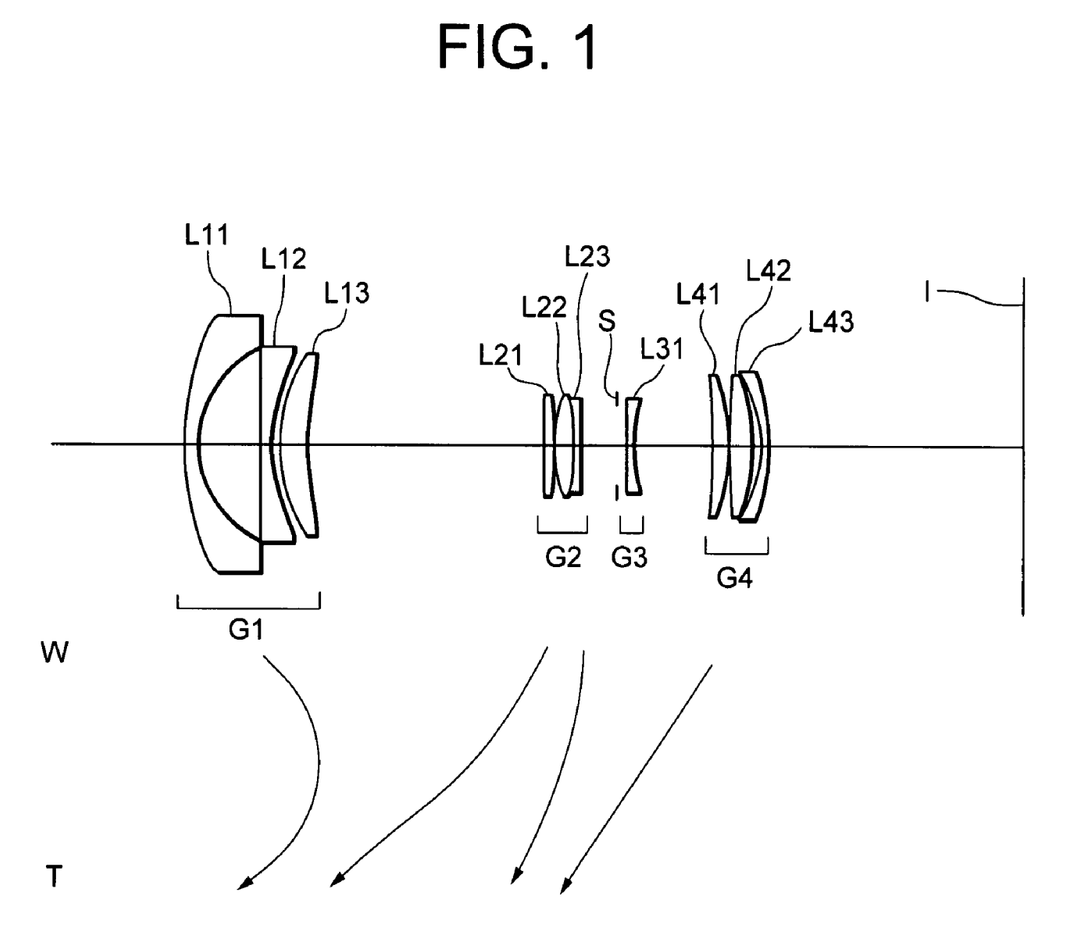
FIG. 1 is a sectional view showing a lens configuration of a zoom lens according to Example 1 of the present invention and zoom trajectories of respective lens groups.

FIG. 1 is a sectional view showing a lens configuration of a zoom lens system according to Example 1 of the present invention and zoom trajectories of respective lens groups.

As shown in FIG. 1, the zoom lens system according to Example 1 of the present invention is composed of, in order from an object, a first lens group G1 having negative refractive power, a second lens group G2 having positive refractive power, a third lens group G3 having negative refractive power, and a fourth lens group G4 having positive refractive power.

In the zoom lens system according to Example 1, when a state of lens group positions varies from a wide-angle end state (W) to a telephoto'end state (T), the first lens group G1 is moved at first to an image and then to the object, and the second lens group G2, the third lens group G3 and the fourth lens group G4 are moved to the object such that a distance between the first lens group G1 and the second lens group G2 decreases, a distance between the second lens group G2 and the third lens group G3 increases, and a distance between the third lens group G3 and the fourth lens group G4 decreases.

The first lens group G1 is composed of, in order from the object, a negative meniscus lens L11 having a convex surface facing the object, a negative meniscus lens L12 having a convex surface facing the object, and a positive meniscus lens L13 having a convex surface facing the object.

The second lens group G2 is composed of, in order from the object, a double convex positive lens L21, and a cemented lens constructed by a double convex positive lens L22 cemented with a double concave negative lens L23.

The third lens group G3 is composed only of a double concave negative lens L31.

The fourth lens group G4 is composed of, in order from the object, a positive meniscus lens L41 having a concave surface facing the object, a double convex positive lens L42, and a negative meniscus lens L43 having a concave surface facing the object.

An aperture stop S is disposed between the second lens group G2 and the third lens group G3, and moved together with the third lens group G3 upon zooming from the wide-angle end state (W) to the telephoto end state (T).

Various values associated with Example 1 are listed in Table 1.

In [Specifications], f denotes a focal length, FNO denotes an f-number, and 2ω denotes an angle of view.

In [Lens Data], the first column shows the lens surface number counted in order from the object side, the second column "r" shows a radius of curvature of the lens surface, the third column "d" shows a distance to the next lens surface, the fourth column "vd" shows Abbe number of the medium at d-line (λ=587.6 nm), and the fifth column "nd" shows refractive index of the medium at d-line (λ=587.6 nm). The symbol "∞" denotes a plane surface, and "B.f." denotes a back focal length. Refractive index of the air 1.00000 is omitted.

In [Aspherical Data], each aspherical coefficient is shown as the aspherical surface is expressed by the following expression:

$$x = (y^2/r)/\left[1 + \{1 - \kappa \times (y/r)^2\}^{1/2}\right] + C3 \times |y|^3 + C4 \times y^4 + C5 \times |y|^5 + C6 \times y^6 + C8 \times y^8 + C10 \times y^{10} + C12 \times y^{12}$$

where y denotes a height from the optical axis, x denotes a distance along the optical axis from tangent plane at the vertex of the aspherical surface to the aspherical surface at the height y, r denotes a paraxial radius of curvature, κ denotes a conical coefficient, and Cn denotes n-th order aspherical coefficient, respectively.

In [Aspherical Data], "E-n" means "$10^{-n}$". For example, "1.234E-05" means "$1.234 \times 10^{-5}$".

An aspherical surface is denoted by an asterisk (*) attached to the surface number in [Lens Data].

In [Variable Distances], the focal length f, variable distances and the back focal length B.f. are shown. In [Values for Conditional Expressions], each value for each conditional expression is shown.

In the tables for various values, "mm" is generally used for the unit of length such as the focal length, the radius of curvature, and the distance to the next lens surface. However, since an optical system proportionally enlarged or reduced its dimension can be obtained similar optical performance, the unit is not necessary to be limited to "mm" and any other suitable unit can be used.

The explanation of reference symbols is the same in the other examples, so that duplicated explanations are omitted.

TABLE I

| [Specifications] | | | |
|---|---|---|---|
| | W | M | T |
| f = | 18.500 | 31.775 | 52.999 |
| FNO = | 3.57 | 4.36 | 5.80 |
| 2ω = | 79.50 | 50.48 | 31.20° |

TABLE I-continued

[Lens Data]

| | r | d | vd | nd |
|---|---|---|---|---|
| 1 | 44.3542 | 2.0000 | 39.58 | 1.804398 |
| *2 | 14.8923 | 9.1138 | | |
| 3 | 313.3575 | 2.0000 | 51.47 | 1.733997 |
| 4 | 28.9589 | 1.1736 | | |
| 5 | 25.9778 | 4.3567 | 23.78 | 1.846660 |
| 6 | 82.7875 | (d6) | | |
| 7 | 230.3233 | 1.6340 | 48.84 | 1.531717 |
| 8 | −49.3813 | 0.2000 | | |
| 9 | 25.9331 | 2.8425 | 42.82 | 1.567322 |
| 10 | −33.6709 | 1.1000 | 23.78 | 1.846660 |
| 11 | 3054.3493 | (d11) | | |
| 12 | ∞ | 1.5000 | Aperture Stop S | |
| 13 | −266.6137 | 1.1000 | 70.23 | 1.487490 |
| 14 | 37.0117 | (d14) | | |
| 15 | −129.3274 | 2.6250 | 64.14 | 1.516330 |
| 16 | −28.3864 | 0.2000 | | |
| 17 | 266.8718 | 3.4563 | 60.66 | 1.563839 |
| 18 | −28.1630 | 0.9598 | | |
| 19 | −21.5867 | 1.2000 | 23.78 | 1.846660 |
| 20 | −34.2053 | (B.f.) | | |

[Aspherical Data]
Surface Number 2

κ = 0.5361
C3 = −2.0093E−5
C4 = −7.7800E−7
C5 = 3.1674E−6
C6 = −3.5011E−7
C8 = 1.5631E−9
C10 = −4.9635E−12
C12 = 7.5634E−15

[Variable Distances]

| | W | M | T |
|---|---|---|---|
| f | 18.50000 | 31.77533 | 52.99902 |
| d6 | 36.02626 | 13.70069 | 2.00000 |
| d11 | 5.20191 | 10.02807 | 12.49651 |
| d14 | 12.32047 | 6.13537 | 2.00000 |
| B.f. | 38.80000 | 52.37513 | 76.03969 |

[Values for Conditional Expressions]

(1) f3/f4 = −1.487
(2) Bfw/fw = 2.100
(3) f1/fw = −1.568
(4) mv4/fw = 2.010
(5) (dif34 − dif23)/dis24w = 0.875

Figure 2A:
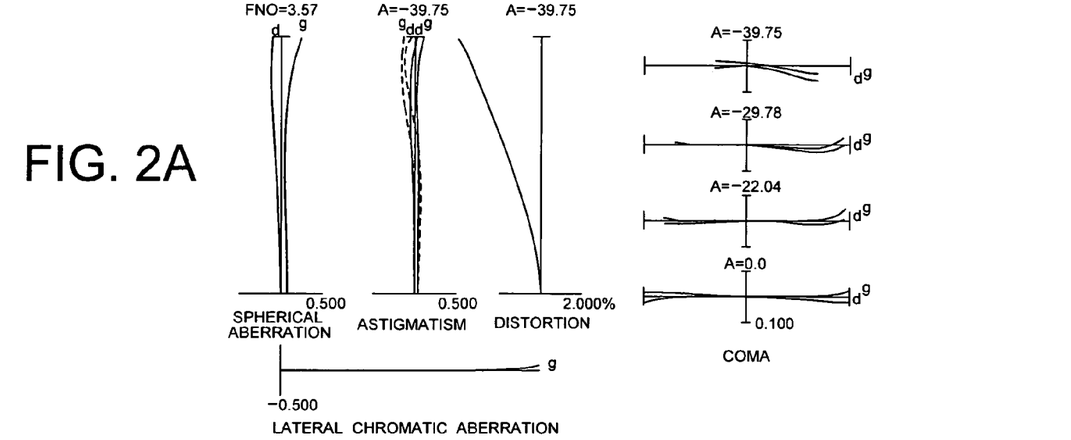
FIGS. 2A, 2B and 2C are graphs showing various aberrations of the zoom lens system according to Example 1 in a wide-angle end state, in an intermediate focal length state and in a telephoto end state, respectively.
Figure 2B:
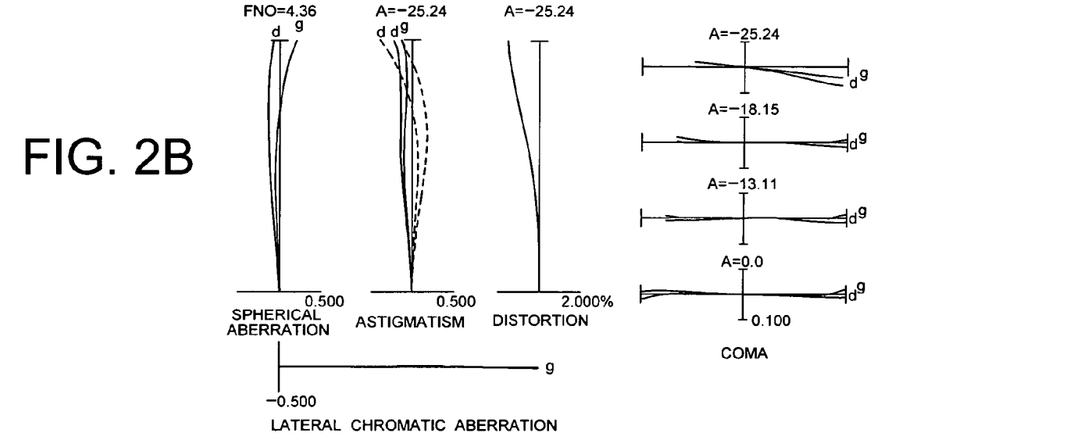
Figure 2C:
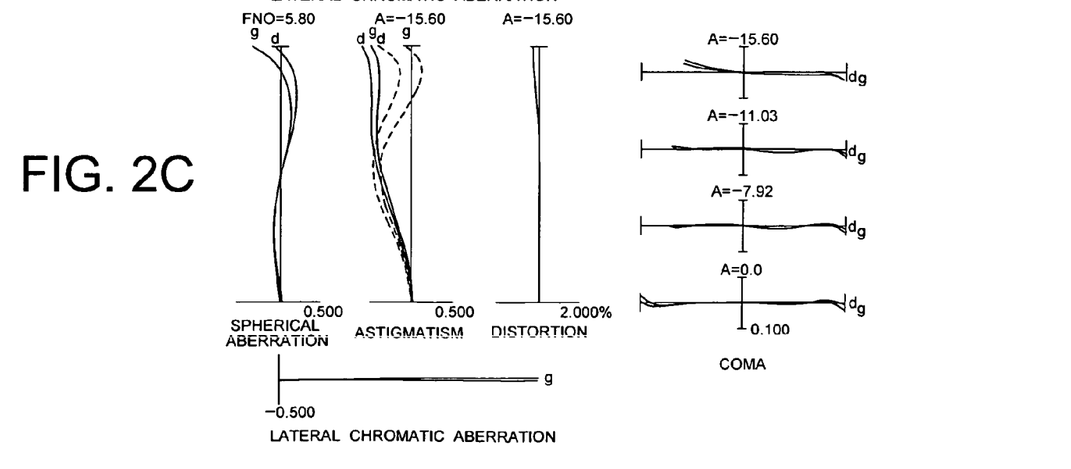

FIGS. 2A, 2B and 2C are graphs showing various aberrations of the zoom lens system according to Example 1 in a wide-angle end state, in an intermediate focal length state and in a telephoto end state, respectively.

In respective graphs, FNO denotes an f-number, A denotes a half angle of view. In the graphs showing spherical aberration, the f-number with respect to the maximum aperture is shown. In graphs showing astigmatism and distortion, the maximum value of incident angle is shown. In graphs showing coma, coma with respect to each incident angle is shown. In respective graphs, "d" denotes aberration curve at d-line (587.6 nm), and "g" denotes aberration curve at g-line (λ=435.8 nm). In graphs showing astigmatism, a solid line indicates a sagittal image plane, and a broken line indicates a meridional image plane. In the following Example 2, the same reference symbols as Example 1 are used, so that duplicated explanations are omitted.

As is apparent from the respective graphs, the zoom lens system according to Example 1 shows superb optical performance as a result of good corrections to various aberrations in each focal length state from the wide-angle end state to the telephoto end state.

EXAMPLE 2

Figure 3:
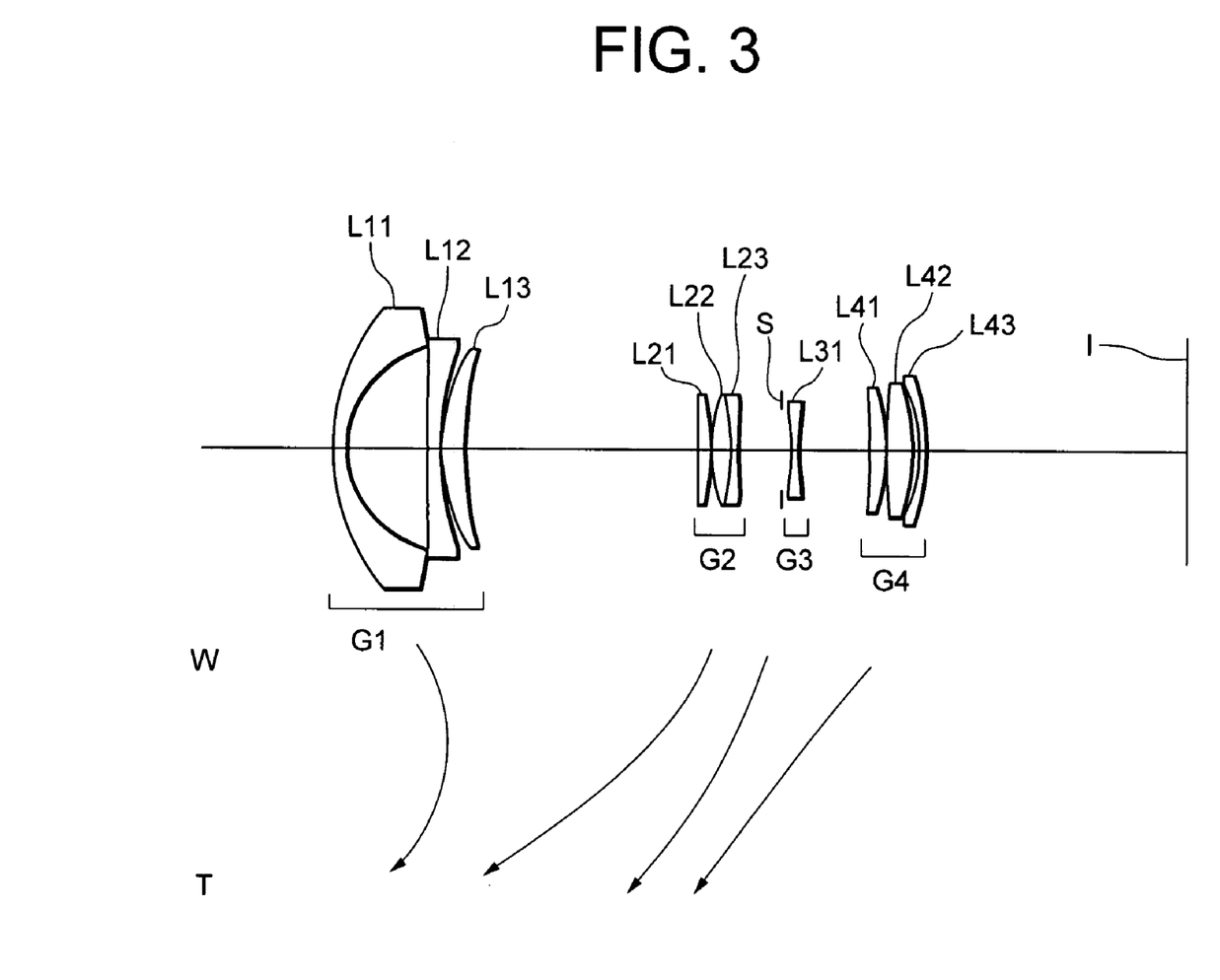
FIG. 3 is a sectional view showing a lens configuration of a zoom lens according to Example 2 of the present invention and zoom trajectories of respective lens groups.

FIG. 3 is a sectional view showing a lens configuration of a zoom lens according to Example 2 of the present invention and zoom trajectories of respective lens groups.

As shown in FIG. 3, the zoom lens system according to Example 2 of the present invention is composed of, in order from an object, a first lens group G1 having negative refractive power, a second lens group G2 having positive refractive power, a third lens group G3 having negative refractive power, and a fourth lens group G4 having positive refractive power.

In the zoom lens system according to Example 2, when a state of lens group positions varies from a wide-angle end state (W) to a telephoto end state (T), the first lens group G1 is moved at first to an image and then to the object, and the second lens group G2, the third lens group G3 and the fourth lens group G4 are moved to the object such that a distance between the first lens group G1 and the second lens group G2 decreases, a distance between the second lens group G2 and the third lens group G3 increases, and a distance between the third lens group G3 and the fourth lens group G4 decreases.

The first lens group G1 is composed of, in order from the object, a negative meniscus lens L11 having a convex surface facing the object, a double concave negative lens L12, and a positive meniscus lens L13 having a convex surface facing the object.

The second lens group G2 is composed of, in order from the object, a positive meniscus lens L21 having a concave surface facing the object, and a cemented lens constructed by a double convex positive lens L22 cemented with a double concave negative lens L23.

The third lens group G3 is composed only of a double concave negative lens L31.

The fourth lens group G4 is composed of, in order from the object, a positive meniscus lens L41 having a concave surface facing the object, a double convex positive lens L42, and a negative meniscus lens L43 having a concave surface facing the object.

An aperture stop S is disposed between the second lens group G2 and the third lens group G3, and moved together with the third lens group G3 upon zooming from the wide-angle end state (W) to the telephoto end state (T).

Various values associated with Example 2 are listed in Table 2.

TABLE 2

[Specifications]

| | W | M | T |
|---|---|---|---|
| f = | 18.500 | 32.000 | 53.000 |
| FNO= | 3.56 | 4.30 | 5.77 |
| 2ω = | 79.50 | 49.96 | 31.16° |

[Lens Data]

| | r | d | vd | nd |
|---|---|---|---|---|
| 1 | 32.5866 | 2.0000 | 51.47 | 1.733997 |
| *2 | 13.4045 | 11.8238 | | |
| 3 | −504.9226 | 2.0000 | 55.53 | 1.696797 |
| 4 | 39.4937 | 0.2000 | | |

TABLE 2-continued

| | | | | |
|---|---|---|---|---|
| 5 | 25.1012 | 3.5863 | 23.78 | 1.846660 |
| 6 | 50.2027 | (d6) | | |
| 7 | −360.9430 | 1.7862 | 48.84 | 1.531717 |
| 8 | −31.7692 | 0.2612 | | |
| 9 | 23.8487 | 2.8422 | 42.82 | 1.567322 |
| 10 | −33.4431 | 1.1000 | 23.78 | 1.846660 |
| 11 | 221.2217 | (d11) | | |
| 12 | ∞ | 1.5000 | Aperture Stop S | |
| 13 | −62.3107 | 1.1000 | 70.23 | 1.487490 |
| 14 | 39.3483 | (d14) | | |
| 15 | −138.0346 | 2.4520 | 64.14 | 1.516330 |
| 16 | −30.9832 | 0.2000 | | |
| 17 | 159.2719 | 3.8530 | 60.66 | 1.563839 |
| 18 | −26.2989 | 0.8112 | | |
| 19 | −21.5719 | 1.2000 | 23.78 | 1.846660 |
| 20 | −30.5941 | (B.f.) | | |

[Aspherical Data]
Surface Number 2

$\kappa = 0.6476$
$C3 = 1.1728\text{E}-6$
$C4 = -5.1866\text{E}-6$
$C5 = 3.3694\text{E}-6$
$C6 = -3.3543\text{E}-7$
$C8 = 1.5349\text{E}-9$
$C10 = -5.2420\text{E}-12$
$C12 = 9.3297\text{E}-15$

[Variable Distances]

| | W | M | T |
|---|---|---|---|
| f | 18.50011 | 32.00018 | 52.99997 |
| d6 | 35.21308 | 13.70062 | 2.00000 |
| d11 | 6.37801 | 11.40945 | 11.83450 |
| d14 | 10.89301 | 4.85577 | 2.00000 |
| B.f. | 38.80045 | 51.49211 | 75.44954 |

[Values for Conditional Expressions]

Figure 4A:
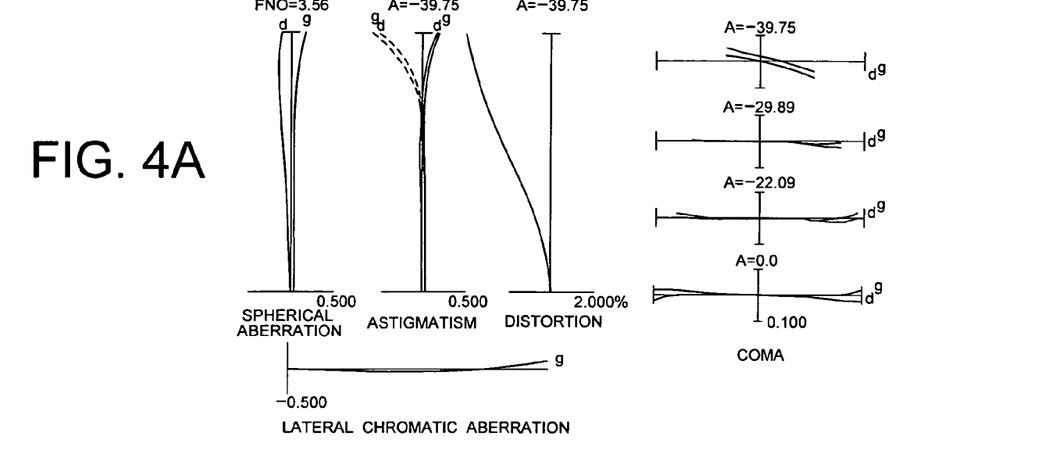
FIGS. 4A, 4B and 4C are graphs showing various aberrations of the zoom lens system according to Example 2 in a wide-angle end state, in an intermediate focal length state and in a telephoto end state, respectively.
Figure 4B:
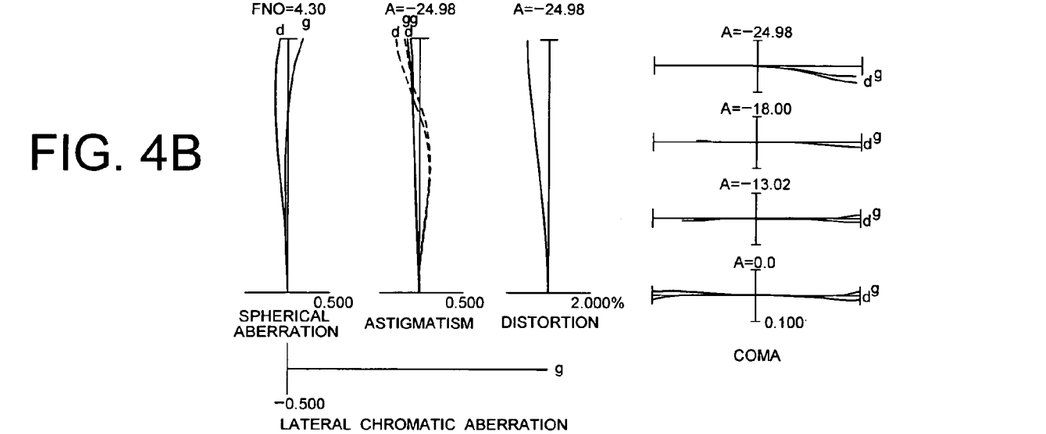
Figure 4C:
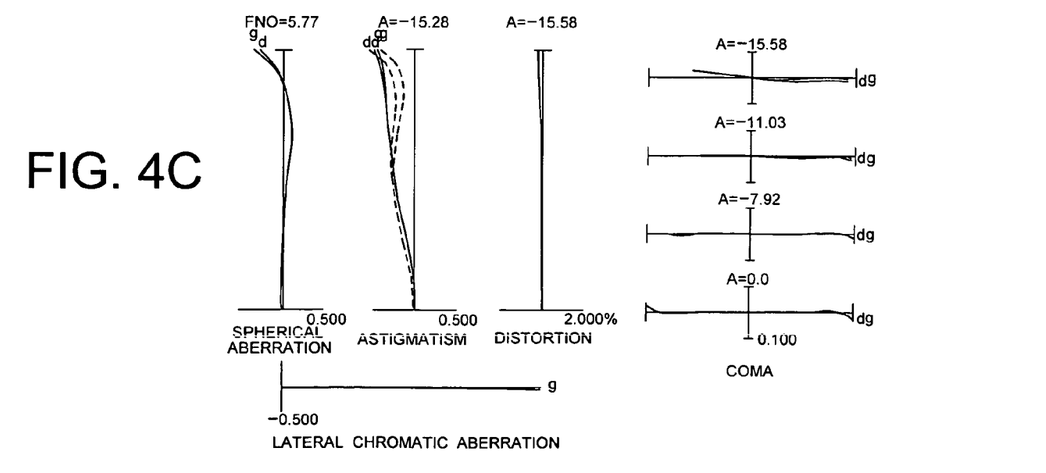

(1) $f3/f4 = -1.302$
(2) $Bfw/fw = 2.097$
(3) $f1/fw = -1.596$
(4) $mv4/fw = 1.981$
(5) $(dif34 - dif23)/dis24w = 0.722$ FIGS. 4A, 4B and 4C are graphs showing various aberrations of the zoom lens system according to Example 2 in a wide-angle end state, in an intermediate focal length state and in a telephoto end state, respectively.

As is apparent from the respective graphs, the zoom lens system according to Example 2 shows superb optical performance as a result of good corrections to various aberrations in each focal length state from the wide-angle end state to the telephoto end state.

As described above, the present invention makes it possible to provide a compact zoom lens system with high optical performance having a zoom ratio of about three and an angle of view of about 80 degrees in the wide-angle end state, suitable for a single-lens reflex digital camera with a solid-state imaging device of the so-called APS-C image size.

In each example, although a four-group type zoom lens system is shown as an embodiment of the present invention, the present invention can be applicable to any other type zoom lens system such as a three-group type zoom lens system, a five-group type zoom lens system, and the like.

Focusing from infinity to a close object may be carried out by moving a portion of a lens group, a lens group or a plurality of lens groups along the optical axis. The focusing lens group(s) may be used for auto focus, and suitable for being driven by a motor such as an ultrasonic motor. In particular, it is preferable that the first lens group is the focusing lens group.

A lens group or a portion of lens group may be moved perpendicularly to the optical axis to be a vibration reduction lens group which corrects an image blur caused by a camera shake. In particular, it is preferable that the third lens group is the vibration reduction lens group.

Any one of lens surface may be formed as an aspherical surface. The aspherical surface may be fabricated by a fine grinding process, a glass molding process that a glass material is formed into an aspherical shape by a mold, or a compound type process that a resin material is formed into an aspherical shape on a glass surface.

In each lens surface, an antireflection coating having high transmittance over a broad wavelength range may be applied to reduce flare or ghost images, so that high optical performance with a high contrast can be attained.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
   a first lens group having negative refractive power;
   a second lens group having positive refractive power;
   a third lens group having negative refractive power; and
   a fourth lens group having positive refractive power;
   when a state of lens group positions varies from a wide-angle end state to a telephoto end state, the second lens group, the third lens group and the fourth lens group being moved to the object such that a distance between the first lens group and the second lens group decreases, a distance between the second lens group and the third lens group increases, and a distance between the third lens group and the fourth lens group decreases,
   the first lens group being composed of at least one positive lens and at least one negative lens,
   the second lens group being composed of at least one positive lens and at least one negative lens,
   the third lens group being composed of a single lens,
   the fourth lens group being composed of at least one positive lens and at least one negative lens, and
   the following conditional expressions being satisfied:

$$3.00 < f3/f4 < -0.60$$

$$1.0 < mf4/fw < 3.00$$

where f3 denotes a focal length of the third lens group, f4 denotes a focal length of the fourth lens group, mv4 denotes a moving amount of the fourth lens group upon zooming from the wide-angle end state to the telephoto end state, and fw denotes a focal length of the zoom lens system in the wide-angle end state.

2. The zoom lens system according to claim 1, wherein the following conditional expression is satisfied:

$$1.70 < Bfw/fw$$

where Bfw denotes a back focal length of the zoom lens system in the wide-angle end state.

3. The zoom lens system according to claim 2, wherein the following conditional expression is satisfied:

−2.00<f1/fw<−1.00 where f1 denotes a focal length of the first lens group.

4. The zoom lens system according to claim 2, wherein the following conditional expression is satisfied:

0.40<(dif34−dif23)/dis24w<1.30 where dif23 denotes a value subtracted a distance between the second lens group and the third lens group in the telephoto end state from a distance between the second lens group and the third lens group in the wide-angle end state, dif34 denotes a value subtracted a distance between the third lens group and the fourth lens group in the telephoto end state from a distance between the third lens group and the fourth lens group in the wide-angle end state, and dis24w denotes a distance along the optical axis between the most image side lens surface in the second lens group and the most object side lens surface in the fourth lens group in the wide-angle end state.

5. The zoom lens system according to claim 1, wherein the following conditional expression is satisfied:

−2.00<f1/fw<−1.00 where f1 denotes a focal length of the first lens group.

6. The zoom lens system according to claim 5, wherein the following conditional expression is satisfied:

0.40<(dif34−dif23)/dis24w<1.30 where dif23 denotes a value subtracted a distance between the second lens group and the third lens group in the telephoto end state from a distance between the second lens group and the third lens group in the wide-angle end state, dif34 denotes a value subtracted a distance between the third lens group and the fourth lens group in the telephoto end state from a distance between the third lens group and the fourth lens group in the wide-angle end state, and dis24w denotes a distance along the optical axis between the most image side lens surface in the second lens group and the most object side lens surface in the fourth lens group in the wide-angle end state.

7. The zoom lens system according to claim 1, wherein the following conditional expression is satisfied:

0.40<(dif34−dif23)/dis24w<1.30 where dif23 denotes a value subtracted a distance between the second lens group and the third lens group in the telephoto end state from a distance between the second lens group and the third lens group in the wide-angle end state, dif34 denotes a value subtracted a distance between the third lens group and the fourth lens group in the telephoto end state from a distance between the third lens group and the fourth lens group in the wide-angle end state, and dis24w denotes a distance along the optical axis between the most image side lens surface in the second lens group and the most object side lens surface in the fourth lens group in the wide-angle end state.

8. The zoom lens system according to claim 1, wherein an aperture stop is disposed adjacent to the third lens group.

9. The zoom lens system according to claim 1, wherein the first lens group includes at least one aspherical surface.

10. The zoom lens system according to claim 1, wherein the third lens group is moved perpendicularly to the optical axis.

11. A zoom lens system comprising, in order from an object:
a first lens group having negative refractive power;
a second lens group having positive refractive power;
a third lens group having negative refractive power; and
a fourth lens group having positive refractive power;
when a state of lens group positions varies from a wide-angle end state to a telephoto end state, the second lens group, the third lens group and the fourth lens group being moved to the object such that a distance between the first lens group and the second lens group decreases, a distance between the second lens group and the third lens group increases, and a distance between the third lens group and the fourth lens group decreases,
the first lens group being composed of at least one positive lens and at least one negative lens,
the second lens group being composed of at least one positive lens and at least one negative lens,
the third lens group being composed of a single lens,
the fourth lens group being composed of at least one positive lens and at least one negative lens, and
the following conditional expression being satisfied:

1.70<Bfw/fw where Bfw denotes a back focal length of the zoom lens system in the wide-angle end state, and fw denotes a focal length of the zoom lens system in the wide-angle end state.

12. The zoom lens system according to claim 11, wherein the following conditional expression is satisfied:

−2.00<f1/fw<−1.00 where f1 denotes a focal length of the first lens group.

13. The zoom lens system according to claim 11, wherein the following conditional expression is satisfied:

1.00<mv4/fw<3.00 where mv4 denotes a moving amount of the fourth lens group upon zooming from the wide-angle end state to the telephoto end state.

14. The zoom lens system according to claim 11, wherein the following conditional expression is satisfied:

0.40<(dif34−dif23)/dis24w<1.30 where dif23 denotes a value subtracted a distance between the second lens group and the third lens group in the telephoto end state from a distance between the second lens group and the third lens group in the wide-angle end state, dif34 denotes a value subtracted a distance between the third lens group and the fourth lens group in the telephoto end state from a distance between the third lens group and the fourth lens group in the wide-angle end state, and dis24w denotes a distance along the optical axis between the most image side lens surface in the second lens group and the most object side lens surface in the fourth lens group in the wide-angle end state.

15. The zoom lens system according to claim 11, wherein an aperture stop is disposed adjacent to the third lens group.

16. The zoom lens system according to claim 11, wherein the first lens group includes at least one aspherical surface.

17. The zoom lens system according to claim 11, wherein the following conditional expression is satisfied:

1.90<Bfw/fw.

18. The zoom lens system according to claim 11, wherein the third lens group is moved perpendicularly to the optical axis.

19. A method for forming an image of an object and varying a focal length of a zoom lens system that includes, in order from the object, a first lens group having negative refractive power, a second lens group having positive refractive power, a third lens group having negative refractive power, and a fourth lens group having positive refractive power, comprising steps of:

providing the zoom lens system in which the first lens group is composed of at least one positive lens and at least one negative lens, the second lens group is composed of at least one positive lens and at least one negative lens, the third lens group is composed of a single lens, and the fourth lens group is composed of at least one positive lens and at least one negative lens, varying the focal length of the zoom lens system from a wide-angle end state to a telephoto end state by moving the second lens group, the third lens group and the fourth lens group to the object such that a distance between the first lens group and the second lens group decreases, a distance between the second lens group and the third lens group increases, and a distance between the third lens group and the fourth lens group decreases, and satisfying the following conditional expressions:

$$-3.00 < f3/f4 < 0.60$$

$$1.0 < mv4/fw < 3.00$$

where f3 denotes a focal length of the third lens group, f4 denotes a focal length of the fourth lens group, mv4 denotes a moving amount of the fourth lens group upon zooming from the wide-angle end state to the telephoto end state, and fw denotes a focal length of the zoom lens system in the wide-angle end state.

20. The method for forming an image of an object and varying a focal length of a zoom lens system according to claim 19, further comprising the step of satisfying the following conditional expression:

$$1.70 < Bfw/fw$$

where Bfw denotes a back focal length of the zoom lens system in the wide-angle end state.

21. The method for forming an image of an object and varying a focal length of a zoom lens system according to claim 19, further comprising the step of satisfying the following conditional expression:

$$-2.00 < f1/fw < -1.00$$

where f1 denotes a focal length of the first lens group.

22. The method for forming an image of an object and varying a focal length of a zoom lens system according to claim 19, further comprising the step of satisfying the following conditional expression:

$$0.40 < (dif34 - dif23)/dis24w < 1.30$$

where dif23 denotes a value subtracted a distance between the second lens group and the third lens group in the telephoto end state from a distance between the second lens group and the third lens group in the wide-angle end state, dif34 denotes a value subtracted a distance between the third lens group and the fourth lens group in the wide-angle end state, and dis24w denotes a distance along the optical axis between the most image side lens surface in the second lens group and the most object side lens surface in the fourth lens group in the wide-angle end state.

23. A method for forming an image of an object and varying a focal length of a zoom lens system that includes, in order from the object, a first lens group having negative refractive power, a second lens group having positive refractive power, a third lens group having negative refractive power, and a fourth lens group having positive refractive power, comprising steps of:

providing the zoom lens system in which the first lens group is composed of at least one positive lens and at least one negative lens, the second lens group is composed of at least one positive lens and at least one negative lens, the third lens group is composed of a single lens, and the fourth lens group is composed of at least one positive lens and at least one negative lens, varying the focal length of the zoom lens system from a wide-angle end state to a telephoto end state by moving the second lens group, the third lens group and the fourth lens group to the object such that a distance between the first lens group and the second lens group decreases, a distance between the second lens group and the third lens group increases, and a distance between the third lens group and the fourth lens group decreases, and satisfying the following conditional expression:

$$1.70 < Bfw/fw$$

where Bfw denotes a back focal length of the zoom lens system in the wide-angle end state, and fw denotes a focal length of the zoom lens system in the wide-angle end state.

24. The method for forming an image of an object and varying a focal length of the zoom lens system according to claim 23, further comprising a step of:

satisfying the following conditional expression:

$$1.90 < Bfw/fw.$$

25. A zoom lens system comprising, in order from an object:

a first lens group having negative refractive power and being composed of at least one positive lens and at least one negative lens;

a second lens group having positive refractive power and being composed of at least one positive lens and at least one negative lens;

a third lens group having negative refractive power and consisting of a single lens; and a fourth lens group having positive refractive power and being composed of at least one positive lens and at least one negative lens;

when a state of lens group positions varies from a wide-angle end state to a telephoto end state, the second lens group, the third lens group and the fourth lens group being moved to the object such that a distance between the first lens group and the second lens group decreases, a distance between the second lens group and the third lens group increases, and a distance between the third lens group and the fourth lens group decreases, and the following conditional expression being satisfied:

$$-3.00 < f3/f4 < -0.60$$

where f3 denotes a focal length of the third lens group, and f4 denotes a focal length of the fourth lens group.

26. The zoom lens system according to claim 25, wherein the following conditional expression is satisfied:

$$1.70 < Bfw/fw$$

where Bfw denotes a back focal length of the zoom lens system in the wide-angle end state, and fw denotes a focal length of the zoom lens system in the wide-angle end state.

27. The zoom lens system according to claim 25, wherein the following conditional expression is satisfied:

$$-2.00 < f1/fw < -1.00$$

where f1 denotes a focal length of the first lens group, and fw denotes a focal length of the zoom lens system in the wide-angle end state.

28. The zoom lens system according to claim 25, wherein the following conditional expression is satisfied:

$$1.00 < mv4/fw < 3.00$$

where mv4 denotes a moving amount of the fourth lens group upon zooming from the wide-angle end state to the telephoto end state.

29. The zoom lens system according to claim 25, wherein the following conditional expression is satisfied:

$$0.40 < (dif34 - dif23)/dis24w < 1.30$$

where dif23 denotes a value subtracted a distance between the second lens group and the third lens group in the telephoto end state from a distance between the second lens group and the third lens group in the wide-angle end state, dif34 denotes a value subtracted a distance between the third lens group and the fourth lens group in the telephoto end state from a distance between the third lens group and the fourth lens group in the wide-angle end state, and dis24w denotes a distance along the optical axis between the most image side lens surface in the second lens group and the most object side lens surface in the fourth lens group in the wide-angle end state.

30. A zoom lens system comprising, in order from an object:
   a first lens group having negative refractive power and being composed of at least one positive lens and at least one negative lens;
   a second lens group having positive refractive power and being composed of at least one positive lens and at least one negative lens;
   a third lens group having negative refractive power and consisting of a single lens; and
   a fourth lens group having positive refractive power and being composed of at least one positive lens and at least one negative lens;
   when a state of lens group positions varies from a wide-angle end state to a telephoto end state, the second lens group, the third lens group and the fourth lens group being moved to the object such that a distance between the first lens group and the second lens group decreases, a distance between the second lens group and the third lens group increases, and a distance between the third lens group and the fourth lens group decreases, and
   the following conditional expression being satisfied:

$$1.70 < Bfw/fw$$

where Bfw denotes a back focal length of the zoom lens system in the wide-angle end state, and fw denotes a focal length of the zoom lens system in the wide-angle end state.

31. The zoom lens system according to claim 30, wherein the following conditional expression is satisfied:

$$-3.00 < f3/f4 < -0.60$$

where f3 denotes a focal length of the third lens group, and f4 denotes a focal length of the fourth lens group.

32. The zoom lens system according to claim 30, wherein the following conditional expression is satisfied:

$$-2.00 < f1/fw < 1.00$$

where f1 denotes a focal length of the first lens group.

33. The zoom lens system according to claim 30, wherein the following conditional expression is satisfied:

$$1.00 < mv4/fw < 3.00$$

where mv4 denotes a moving amount of the fourth lens group upon zooming from the wide-angle end state to the telephoto end state.

34. The zoom lens system according to claim 30, wherein the following conditional expression is satisfied:

$$0.40 < (dif34 - dif23)/dis24w < 1.30$$

where dif23 denotes a value subtracted a distance between the second lens group and the third lens group in the telephoto end state from a distance between the second lens group and the third lens group in the wide-angle end state, dif34 denotes a value subtracted a distance between the third lens group and the fourth lens group in the telephoto end state from a distance between the third lens group and the fourth lens group in the wide-angle end state, and dis24w denotes a distance along the optical axis between the most image side lens surface in the second lens group and the most object side lens surface in the fourth lens group in the wide-angle end state.

35. A zoom lens system comprising, in order from an object:
   a first lens group having negative refractive power and being composed of at least one positive lens and at least one negative lens;
   a second lens group having positive refractive power and being composed of at least one positive lens and at least one negative lens;
   a third lens group having negative refractive power and being composed of a single lens, the third lens group being moved perpendicularly to the optical axis; and
   a fourth lens group having positive refractive power and being composed of at least one positive lens and at least one negative lens;
   when a state of lens group positions varies from a wide-angle end state to a telephoto end state, the second lens group, the third lens group and the fourth lens group being moved to the object such that a distance between the first lens group and the second lens group decreases, a distance between the second lens group and the third lens group increases, and a distance between the third lens group and the fourth lens group decreases, and
   the following conditional expression being satisfied:

$$-3.00 < f3/f4 < -0.60$$

where f3 denotes a focal length of the third lens group, and f4 denotes a focal length of the fourth lens group.

36. The zoom lens system according to claim 35, wherein the following conditional expression is satisfied:

$$-2.00 < f1/fw < -1.00$$

where f1 denotes a focal length of the first lens group, and fw denotes a focal length of the zoom lens system in the wide-angle end state.

37. The zoom lens system according to claim 35, wherein the following conditional expression is satisfied:

$$1.00 < mv4/fw < 3.00$$

where mv4 denotes a moving amount of the fourth lens group upon zooming from the wide-angle end state to the telephoto end state, and fw denotes a focal length of the zoom lens system in the wide-angle end state.

38. A zoom lens system comprising, in order from an object:
   a first lens group having negative refractive power and being composed of at least one positive lens and at least one negative lens;

a second lens group having positive refractive power and being composed of at least one positive lens and at least one negative lens;
a third lens group having negative refractive power and being composed of a single lens, the third lens group being moved perpendicularly to the optical axis; and
a fourth lens group having positive refractive power and being composed of at least one positive lens and at least one negative lens;
when a state of lens group positions varies from a wide-angle end state to a telephoto end state, the second lens group, the third lens group and the fourth lens group being moved to the object such that a distance between the first lens group and the second lens group decreases, a distance between the second lens group and the third lens group increases, and a distance between the third lens group and the fourth lens group decreases, and
the following conditional expression being satisfied:

$$1.70 < Bfw/fw$$

where Bfw denotes a back focal length of the zoom lens system in the wide-angle end state, and fw denotes a focal length of the zoom lens system in the wide-angle end state.

39. The zoom lens system according to claim 38, wherein the following conditional expression is satisfied:

$$1.90 < Bfw/fw.$$

40. The zoom lens system according to claim 38, wherein the following conditional expression is satisfied:

$$0.40 < (dif34 - dif23)/dis24w < 1.30$$

where dif23 denotes a value subtracted a distance between the second lens group and the third lens group in the telephoto end state from a distance between the second lens group and the third lens group in the wide-angle end state, dif34 denotes a value subtracted a distance between the third lens group and the fourth lens group in the telephoto end state from a distance between the third lens group and the fourth lens group in the wide-angle end state, and dis24w denotes a distance along the optical axis between the most image side lens surface in the second lens group and the most object side lens surface in the fourth lens group in the wide-angle end state.

* * * * *